United States Patent
Sandland

(10) Patent No.: US 6,926,941 B2
(45) Date of Patent: Aug. 9, 2005

(54) LAMINATES OF THERMOPLASTIC FLUORORESINS AND THEIR MANUFACTURE

(75) Inventor: Nicholas Sandland, Gwent (GB)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/415,349

(22) PCT Filed: Nov. 6, 2001

(86) PCT No.: PCT/GB01/04915

§ 371 (c)(1), (2), (4) Date: Sep. 9, 2003

(87) PCT Pub. No.: WO02/38668

PCT Pub. Date: May 16, 2002

(65) Prior Publication Data

US 2004/0038039 A1 Feb. 26, 2004

(30) Foreign Application Priority Data

Nov. 7, 2000 (GB) .............................................. 0027188

(51) Int. Cl.$^7$ ........................... B32B 1/08; B32B 25/08; B32B 27/06; B32B 31/00
(52) U.S. Cl. ................... 428/36.8; 428/36.91; 428/413; 428/421; 428/521; 428/522
(58) Field of Search .............................. 428/36.8, 36.91, 428/413, 421, 422, 521, 522; 525/107

(56) References Cited

U.S. PATENT DOCUMENTS 4,994,319 A * 2/1991 Nojima et al. .............. 428/335

FOREIGN PATENT DOCUMENTS

| EP | 0 545 368 A1 | 6/1993 |
| EP | 0 582 301 A | 2/1994 |
| EP | 1 038 917 A | 9/2000 |
| WO | WO 97 28216 A | 8/1997 |

* cited by examiner

Primary Examiner—Ramsey Zacharia
(74) Attorney, Agent, or Firm—Armstrong, Kratz, Quintos, Hanson & Brooks, LLP

(57) ABSTRACT

A laminated product, in particular a fuel hose, comprises a fluororesin layer and, superimposed on the fluororesin layer, a layer of cured rubber obtained or obtainable by curing a rubber composition comprising a blend of 60 to 95 wt % highly-saturated nitrile copolymer rubber with 40 to 5 wt % epihalohydrin rubber. The rubber blend layer can be made to adhere well to the fluororesin layer by curing it in situ. The nitrile rubber component confers heat resistance on the rubber layer while adhesion is maintained.

12 Claims, No Drawings

LAMINATES OF THERMOPLASTIC FLUORORESINS AND THEIR MANUFACTURE

This invention relates to laminated products comprising a layer of thermoplastic fluororesin laminated with a rubber layer. It may have particular application for fuel hoses, and other practical applications in which a combination of oil resistance and flexibility is called for.

BACKGROUND

It is known that thermoplastic fluororesins have excellent oil resistance and are therefore useful as a material in fuel hoses for automobiles and aircraft. However fluororesins are poor in flexion properties in that they are liable to fatigue, leading to rupture. For this reason fluororesins are not used alone to make fuel hoses. Rather, an epichlorohydrin rubber or ethylene-acrylate rubber is used to provide an outer layer for the hose, with the fluororesin as an inner layer.

In recent years there has been increasing demand for fuel hoses with better heat resistance. Ethylene acrylate rubbers have generally good heat resistance. But, their oil/fuel resistance is poor leading to danger if the inner fluororesin layer ruptures. Epichlorohydrin rubbers are better in this respect, but their heat resistance is poor.

OBJECTS OF THE INVENTION

It is desired to provide new and useful laminated products comprising a fluororesin layer and a cured rubber layer, in which oil resistance can be combined with one or more and preferably all of flexibility, weather resistance and heat resistance. Another aspect of the present aims is to provide a method of making such laminated products. More specific aspects are a fuel hose or other fuel- or oil-retainment article made from or comprising such a laminate, and a method of making such a hose or other article.

THE INVENTION

The inventor has conducted extensive researches and has found that a rubber composition which is a blend of highly-saturated nitrile group-containing rubber and epihalohydrin rubber can give a good combination of oil resistance, flexibility and heat and weather resistance. Furthermore, by contacting the fluororesin layer with a curable composition blend of the above-mentioned rubbers and curing the rubber composition blend in contact with the fluororesin layer, a good adhesion between the two layers can be achieved.

These are surprising and valuable findings because, although highly-saturated nitrile group-containing copolymer rubbers have good properties of oil-resistance, weather resistance and heat resistance it has not been practical to adhere a highly-saturated nitrile group-containing copolymer rubber properly to a fluororesin layer.

A first aspect of the invention provides a laminated product comprising a fluororesin layer and, superimposed on the fluororesin layer, a layer of cured rubber obtained or obtainable by curing a rubber composition comprising a blend of 60 to 95 wt % highly-saturated nitrile copolymer rubber with 40 to 5 wt % epihalohydrin rubber.

The laminated product may feature a contact bond between the fluororesin layer and cured rubber layer achieved by means of curing the rubber blend composition in contact with the fluororesin layer.

In a particular embodiment the product is a conduit or vessel consisting essentially of or comprising such a laminate, and particularly which is to retain an oil or oil-based fluid such as a fuel. A fuel hose is a preferred embodiment.

A second aspect of the invention is a process for preparing such a laminated product, comprising contacting a layer of thermoplastic fluororesin with a layer of rubber blend composition as specified herein, and curing the rubber composition to form a cured rubber layer bonded directly to the fluororesin layer.

FURTHER DETAILS; OPTIONS AND PREFERENCES

Thermoplastic fluororesins usable herein for the fluororesin layer may be of a type already familiar to the skilled person and can be selected in accordance with conventional practice.

In general such resins feature a fluorinated hydrocarbon main chain. The fluororesin melting point is preferably at least 100° C., more preferably at least 110° C., more preferably 120° C. It is preferably not more than (up to) 320°, more preferably 250° C., more preferably 175° C. Melt flow index measured at 265° C./5 kg is preferably at least 5, preferably not more than 60.

The thermoplastic fluororesin preferably has more than 50 wt % monomer residues selected from vinylidene fluoride, hexafluoropropylene and tetrafluoroethylene units. Examples of suitable fluororesins include terpolymers of vinylidene fluoride, hexafluoropropylene and tetrafluoroethylene, copolymers of ethylene and tetrafluoroethylene, copolymers of hexafluoropropylene and tetrafluorethylene, polyvinylidene fluorides, and polytetrafluoroethylenes. Among these a terpolymer of vinylidene fluoride, hexafluoropropylene and tetrafluoroethylene is preferred. Examples of suitable fluororesins on the market include THV200, THV410, THV500 and THV500G produced by Dyneon GmbH, and equivalents thereof.

Any suitable preparation process may be used for the fluororesin. Additives which may be conventional, e.g reinforcing agents, antioxidants, other oxidation inhibitors, processing aids and so forth may be compounded with it according to preference and the particular technical demands involved. Other resins may be blended with the fluororesin, especially in minor quantities, provided that the desired fluororesin properties are retained.

In the present invention a particular type of rubber, comprising a blend of nitrile rubber and epichlorohydrin rubber, is laminated with the fluororesin layer.

The nitrile rubber is generally one obtained by copolymerising an $\alpha,\beta$-ethylenically unsaturated nitrile monomer with one or more other monomers, and optionally hydrogenated to achieve a suitable level of unsaturation depending on the monomers used and the technical demands on the product.

The nitrile monomer may be selected in accordance with conventional practice. Suitable examples include acrylonitrile, methacrylonitrile and $\alpha$-chloro-acrylonitrile, with acrylonitrile being preferred. The content of nitrile monomer residues in the rubber is preferably at least 10 wt %, more preferably 13 wt %, most preferably 15 wt %. Preferably it is not more than (up to) 70 wt %, more preferably 60 wt %, most preferably 50 wt %.

The monomer to be copolymerised with the nitrile monomer can be selected in accordance with conventional practice for nitrile rubbers. One or more may be selected from conjugated diene-monomers, other diene monomers, $\alpha$-olefins and other copolymerisable monomers.

When conjugated diene is used the content of residues thereof in the copolymer is preferably at least 30, more preferably at least 40 and most preferably at least 50 wt %. Preferably it is not more than (up to) 90, more preferably 87, most preferably 85 wt %. When using conjugated diene the rubber thus obtained may have a high iodine value. If the iodine value is too high it may be lowered by hydrogenating carbon-carbon double bonds in the copolymer, using conventional hydrogenation.

Examples of suitable conjugated dienes include 1,3-butadiene, isoprene, 2,3-dimethyl-1,3-butadiene and 1,3-pentadiene. 1,3-butadiene is preferred.

Among other dienes, those having from 5 to 12 carbon atoms are preferred. Suitable examples include 1,4-hexadiene and 1,4-pentadiene.

Among α-olefins, those having from 2 to 12 carbon atoms are preferred. Suitable examples include ethylene, propylene, 1-butene, 4-methyl-1-pentene, 1-hexene and 1-octene.

Examples of other monomers capable of copolymerising with nitrile monomers include ethylenically-unsaturated carboxylic acid ester monomers, aromatic vinyl monomers, fluoroalkyl-containing vinyl monomers, ethylenically-unsaturated monocarboxylic acids and the like.

The Mooney viscosity ($ML_{1+4}$, 100° C.) of the nitrile rubber is preferably at least 15, more preferably at least 30 and most preferably at least 45. It is preferably not more than (up to) 200, more preferably up to 150, most preferably up to 100. If the Mooney viscosity is very low the strength of the product may be undesirably reduced, whereas if it is very high the processability of the rubber composition is affected.

In general the nitrile rubber should be highly saturated to avoid undesirable heat aging in air. Thus the iodine value of the rubber is preferably not more than 120, more preferably not more than 60, and most preferably not more than 30.

Epihalohydrin rubbers, particularly epichlorohydrin rubbers, are in themselves well-known. Generally speaking they are polymers obtained by ring-opening polymerisation of epihalohydrin monomer, either alone or as a copolymer with a copolymerisable monomer.

The Mooney viscosity (ML1+4, 100° C.) of the epihalohydrin rubber used herein is preferably at least 20, more preferably at least 30, most preferably at least 35. If the Mooney viscosity is very low retention of shape during rubber processing is sometimes insufficient and the rubber compound may become too tacky. The Mooney viscosity is preferably not more than (up to) 150, more preferably up to 120, most preferably up to 100. If it is very high the flow of the compound during rubber processing may be poor and dimensional stability is sometimes reduced.

Suitable epihalohydrin monomers include epichlorohydrin, epibromohydrin and β-methyl-epichlorohydrin. Epichlorohydrin is preferred. The content of epihalohydrin monomer residues in the epihalohydrin rubber is preferably at least 20 mol %, more preferably at least 30 mol %. If the mole content of epihalohydrin monomer residues is very low the cured rubber tends to be rather hygroscopic. The epihalohydrin residue content is preferably not more than (up to) content is very high the cold resistance of the cured rubber may be adversely affected.

Alkylene oxide monomers are preferable as monomers copolymerisable with epihalohydrin monomer. The monomer is ethylene oxide, or a compound in which at least one of the hydrogen atoms of the ethylene oxide structure is substituted by a saturated hydrocarbon group. The substituting group may be a halogen-containing group. Suitable examples include ethylene oxide, propylene oxide, 1,2-epoxybutane, 2,3-epoxybutane, 1,2-epoxyhexane, 1,2-epoxy-isobutane, 1,2-epoxy-3-methylpentane, 1,2-epoxycyclopentane, 1,2-epoxycyclohexane, 2,3-epoxy-3-chloromethyl-butane and 1,2-epoxy-4-chloropentane. Ethylene oxide and-propylene oxide are preferred.

The content of alkylene oxide residues in the epihalohydrin rubber is preferably at least 10, more preferably at least 20 mol %. If the mole content of alkylene oxide residues is very low the cold resistance of the cured rubber tends to be poor. This content is preferably not more than (up to) 80 mol %, more preferably not more than 70 mol %. If is very high the product tends to foam during processing and the hygroscopic property of the cured rubber is sometimes high, leading in some cases to difficulties in using the product depending on the processing and usage conditions.

An ethylenically-unsaturated monomer which is copolymerisable in the ring-opening copolymerisation with the epihalohydrin monomer and the optional alkylene oxide monomer can be used. Suitable examples include vinyl glycidyl ether, allyl glycidyl ether, glycidyl acrylate, glycidyl methacrylate, vinyl cyclohexyl ether and 3,4-epoxy-1-butene. Allyl glycidyl ether, leading to cured products of excellent ozone resistance, is preferable. The content of residues of such other monomer in the epihalohydrin rubber is preferably not larger than 15 mol %, more preferably not larger than 12 mol % and most preferably not larger than 10 mol %. If the content of such other monomer is too large, the "elongation at break" of the cured product may be low.

The combination of these rubbers used in the present invention comprises from 60 to 95 wt %, preferably from 65 to 93 wt % of the highly saturated nitrile rubber and from 40 to 5 wt %, preferably from 35 to 7 wt %, of the epihalohydrin rubber. If the content of the nitrile rubber is too small, fuel-transmissibility through the rubber layer is excessive if the fluororesin layer ruptures. If the nitrile rubber content is too large, adhesion between the fluororesin layer and the cured rubber layer tends to be weak.

The rubber in the curable rubber composition may consist entirely or essentially of the two above-specified rubber types. However it is possible to include a proportion—typically a minor proportion—of other rubber provided that adequate properties are maintained, in which case the % ge values specified above are to be interpreted as relative parts by weight out of 100 parts of the two rubber types.

The rubber composition is rendered curable by the inclusion of curing agent. The curing agent used is not particularly limited, but an organic peroxide curing agent is preferable. Examples of suitable organic peroxide curing agents include dicumyl peroxide, tert-butyl cumyl peroxide and 1,3-bis(tert-butylperoxy isopropyl) benzene. The amount of the organic peroxide curing agent is not particularly limited, but is preferably in the range of 0.1 to 15 parts by weight, more preferably 0.5 to 12 parts by weight, based on 160 parts by weight of the rubber components in the rubber composition.

It is preferred that an acid receiver, such as are generally used as a compounding agent in epihalohydrin rubbers, is included in the rubber composition. Suitable acid receivers include oxides, hydroxides and carbonates of alkali,metals and alkaline earth metals. Specific examples include magnesium oxide, calcium oxide, zinc oxide, sodium hydroxide, calcium hydroxide, magnesium hydroxide and sodium carbonate. The amount of acid receiver is preferably in the range of 0.5 to 5 parts by weight, more preferably 1 to 3 parts by weight based on 100 parts by weight of the rubber components of the rubber composition. Inclusion of an acid receiver can promote adhesion between the fluororesin layer and the cured rubber layer, but if the amount of acid receiver is too large the cured rubber layer tends to be weakened.

The rubber composition may contain any suitable additives such as resin, reinforcing agent, curing aid, curing accelerator, oil, plasticiser, antioxidant, oxidation inhibitor, light stabiliser, processing aid, anti-friction additive, adhesive, lubricant, flame retarder, mildewcide, antistatic agent and colorant if desired.

The method of formation of the fluororesin and rubber composition layers is not particularly limited but extrusion moulding is preferable, especially when making a fuel hose having the fluororesin layer as an inner layer and the cured rubber layer as an outer layer.

The preparation of a laminate wherein the fluororesin layer and the rubber layer are firmly adhered by disposing the fluororesin in contact with the layer of the rubber composition, and curing the rubber composition to form a cured rubber layer with the fluororesin layer and the cured rubber layer adhered at the interface.

The method for achieving curing-adhesion at the interface is not particularly limited. Conventional methods used for achieving or enhancing the curing-adhesion between fluororesin and epihalohydrin rubber can be employed.

Thus it is preferable to use an organic phosphonium salt at the interface between the fluororesin layer and the rubber composition layer.

The organic phosphonium salt is a compound as follows:

wherein $R^1$, $R^2$, $R^3$ and $R^4$ each represent a hydrocarbon group which may have a substituent and X represents a univalent minus ion. Among these, compounds of the following formula are preferred:

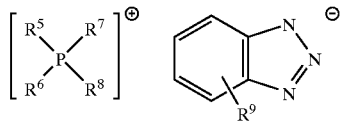

wherein $R^5$, $R^6$, $R^7$ and $R^8$ may each represent a hydrocarbon group having 1 to 20 carbon atoms which may have a substituent, while no more than three of $R^5$, $R^6$, $R^7$ and $R^8$ may be primary, secondary or tertiary amino groups or fluoroalkyl, and $R^9$ represents hydrogen or an alkyl group having 1 to 20 carbon atoms. Examples of the organic phosphonium salt include tetrabutylphosphonium benzotriazolate, tetraoctylphosphonium benzotriazolate, methyltrioctylphosphonium benzotriazolate, tetrabutylphosphonium tolyltriazolate and tetraoctylphosphonium tolyltriazolate.

The method of using the organic phosphonium salt is not particularly limited. Suitable methods include compounding it into the fluororesin and/or the rubber composition, or coating it on the surface of the fluororesin layer which is in contact with the rubber composition layer and/or on the surface of the rubber composition layer which is in contact with the fluororesin layer. Compounding into the rubber composition is preferable.

When the organic phosphonium salt is compounded into the the rubber composition, the amount of the organic phosphonium salt is preferably in the range of 0.5 to 10 parts by weight, more preferably 1 to 5 parts by weight and most preferably 1.5 to 3 parts by weight based on 100 parts by weight of the rubber components of the rubber composition.

When the organic phosphonium salt is coated on a contact surface, the organic phosphonium salt may be dissolved or dispersed in an organic solvent and coated e.g. by spraying or brush-coating. Suitable organic solvents include acetone, methyl ethyl ketone, methyl alcohol, ethyl alcohol, benzene, toluene and xylene. The concentration of the solution or dispersion is preferably in the range 5 to 20 wt % for ease of coating and rate of evaporation of the solvent.

It is preferable to use a bisphenol at the contact interface between the fluororesin layer and the rubber composition layer. This is a compound having a carbon atom bonded with two phenols. Examples include bisphenol AF, bisphenol F, bisphenol A, 3,3'-tetrachloro-bisphenol A, bisphenol S, 5,5'-tetrabromo-bisphenol S, hydrogenated bisphenol A and 4,4'-bis-sulfonylphenol. 4,4'-bis-sulfonylphenol is preferred.

The method of using the bisphenol is not particularly limited. They may be compounded into the fluororesin and/or the rubber composition, or coated on the surface of the fluororesin layer which is in contact with the rubber composition layer and/or on the surface of the rubber composition layer which is in contact with the fluororesin layer. Compounding into the rubber composition is preferable.

When bisphenol is compounded into the the rubber composition, the amount of bisphenol is preferably in the range of 0.05 to 2 parts by weight, more preferably 0.1 to 1.5 parts by weight and most preferably 0.2 to 1 parts by weight based on 100 parts by weight of the rubber components of the rubber composition.

The method of curing the rubber composition layer is not particularly limited, and may be appropriately chosen from conventional heating methods such as press heating, steam heating, oven heating, hot-air heating, infrared radiation heating and microwave heating. The heating temperature and curing time are not particularly limited. Heating temperature is preferably in the range 130 to 200° C., more preferably 140 to 180°. Curing time is preferably from 1 to 15 minutes. These can be determined using the skilled person's expertise.

The thicknesses of the respective layers in the laminate may be determined in accordance with conventional practice and/or routine testing for the intended purpose. The laminate preferably consists of the two mentioned layers, although the presence of one or more further layers is not ruled out.

EXAMPLES

The invention is now illustrated by means of the following examples. Note: all parts and % are by weight unless otherwise specified.

Tests used in the Examples were as follows.

Tensile strength, elongation and tensile stress at 100% elongation of, the cured rubber were measured according to JIS K6251. Hardness was measured using a JIS type A spring hardness tester according to JIS K5253.

Compression set was measured after a moulded specimen had been maintained at a temperature of 150° C. for 70 hours, according to JIS K6254.

Characteristics of cured rubber after a specimen of cured rubber was maintained at a temperature of 150° C. for 70 hours were measured by the same method as described above.

The volume change and changes in other properties were measured after a specimen of rubber was maintained in diesel fuel oil at 60° C. for 70 hours.

To evaluate the adhesion between the fluororesin layer and the layer of cured rubber, peel-off strength was measured at a peel-off rate of 50 mm/min. according to JIS K6256. A proportion of rubber-sticking was measured by observing the peeled-off surface of the fluororesin layer after the peel-off test, measuring the area of residual stuck rubber on the fluororesin surface, and expressing this as a percentage of the total area of the peeled surface.

Example 1

The following ingredients were mixed using a open-roll at a temperature of 50° C. to prepare a curable rubber composition. Each measurement was carried out using the curable rubber composition. The results are shown in Table 1.

- 90 parts by weight of a hydrogenated acrylonitrile-butadiene copolymer (iodine value: 11; content of acrylonitrile units: 36 wt %; Mooney viscosity (ML1+4, 100° C.): 57);
- 10 parts by weight of epichlorohydrin rubber {content of epichlorohydrin units:40 mol %, content of ethylene oxide units: 56 mol %, content of allyl glycidyl ether units: 4 mol %, Mooney viscosity {ML1+4, 100° C.): 60);
- 50 parts by weight of carbon black (FEF I Seast SO (trade mark) produced by Tokai Carbon);
- 10 parts by weight of plasticiser (tri-n-octyltrimellitate);
- 2 parts by weight antioxidant (50 wt % zinc salt of 2-mercapto-methylbenzimidazole, 50 wt % 4,4'-($\alpha,\alpha'$-dimethylbenzyl)diphenylamine);
- 2 parts by weight sodium carbonate;
- 0.5 parts by weight of bisphenol-containing. compound (75 wt %; bisphenol {4,4'-bis-sulfonylphenol) DYNAMAR FC 5157 produced by Sartomer Company);
- 2 parts by weight of tetrabutylphosphonium benzotriazolate;
- 12 parts by weight of curing agent {40 wt % organic peroxide (1,3-bis(tert-butylperoxy isopropyl) benzene): Vul-cup 4OKE produced by Herculeis Inc.).

The fluororesin used was a terpolymer of vinylidene fluoride, hexafluoropropylene and tetrafluoroethylene, melting point: 162 to 174° C.; melt flow index at 265° C./5 kg: 5 to 15, THV 500G produced by Dyneon GmbH. Each of the fluororesin and the curable rubber composition was mixed using a six-inch (152 mm) open roll to sheets of uniform 2 mm thickness. Each sheet was cut to a sample of 6×10 cm. The edge part of each sample was covered with cellophane paper so that the covered portion would not adhere to others, and was left to be gripped by a chuck in a pee- off test. The fluororesin sample and the curable rubber composition sample were laminated, and pressed together under a pressure of 4 MPa at 170° C. for 15 minutes, to form a laminate wherein the fluororesin layer and the cured layer of rubber composition were adhered by curing. The peel-off strength and the proportion of rubber-sticking area of the laminate were measured. The results are shown in Table 1.

Examples 2–3 and Comparative Examples 1–2

Substantially the same procedure as described in Example 1 was carried out, except that the contents of hydrogenated acrylonitrile-butadiene copolymer and epichlorohydrin rubber were changed as indicated in Table 1, which also shows the test results.

| | EXAMPLE | | | COMPARATIVE EXAMPLE | |
|---|---|---|---|---|---|
| | 1 | 2 | 3 | 1 | 2 |
| COMPONENT OF RUBBER COMPOSITION (PARTS BY WEIGHT) | | | | | |
| Hydrogenated Product of Acrylonitrile-Butadiene copolymer | 90 | 95 | 70 | 50 | 100 |
| Epichlorohydrin rubber | 10 | 5 | 30 | 50 | — |
| Tetrabutylphosphonium benzotriazolate | 2 | 2 | 2 | 2 | 2 |
| Sodium Carbonate | 2 | 2 | 2 | 2 | 2 |
| Bisphenol-containing compound | 0.5 | 0.5 | 0.5 | 0.5 | 0.5 |
| CHARACTERISTICS OF CURED RUBBER | | | | | |
| Tensile Strength (MPa) | 24.5 | 26.0 | 15.0 | 13.0 | 20.4 |
| Elongation (%) | 190 | 250 | 220 | 240 | 480 |
| Tensile Stress at 100% elongation (MPa) | 11 | 13.8 | 6 | 4 | 4 |
| Hardness | 79 | 80 | 75 | 74 | 73 |
| Compression Set | 32 | 27 | 46 | 70 | 40 |
| CHANGES OF PROPERTIES UNDER HEAT STABILITY TEST IN AIR | | | | | |
| Tensile Strength (MPa) | 23.3 | 24.0 | 13.0 | 10.0 | 18.5 |
| Change rate after test (%) | −5.9 | −7.7 | −13.3 | −23.1 | −9.3 |
| Elongation (%) | 180 | 230 | 180 | 180 | 400 |
| Change rate after test (%) | −5.3 | −8.0 | −18.2 | −25.0 | −16.7 |
| Tensile Stress at 100% elongation (MPa) | 12.3 | 15.0 | 8.2 | 6.2 | 5.6 |
| Change rate after test (%) | +11.8 | +8.7 | +36.7 | +55.0 | +40.0 |
| Hardness | 81 | 82 | 78 | 80 | 77 |
| Change volume after test | +2 | +2 | +3 | +6 | +4 |
| CHANGES OF PROPERTIES UNDER IMMERSION TEST IN FUEL OIL | | | | | |
| Volume change rate after test (%) | +18.9 | +12.3 | +23.6 | +38.6 | +12.8 |
| Tensile Strength (MPa) | 20.2 | 21.8 | 10.8 | 8.2 | 17.8 |
| Change rate after test (%) | −17.6 | −16.2 | −28.0 | −36.9 | −12.7 |
| Elongation (%) | 180 | 230 | 190 | 160 | 400 |
| Change rate after-test (%) | −5.3 | −8.0 | −13.6 | −33.3 | −17.7 |
| Tensile Stress at 100% elongation (MPa) | 9.7 | 11.8 | 4.8 | 2.4 | 3.2 |
| Change rate after test (%) | −11.8 | −14.5 | −20.0 | −40.0 | −20.0 |
| Hardness | 70 | 74 | 65 | 58 | 63 |
| Change volume after test | −9 | −6 | −10 | −16 | −10 |
| ADHESION BETWEEN THE FLUORORESIN LAYER AND THE CURED LAYER OF THE RUBBER COMPOSITION | | | | | |
| Peel Off Strength (N/25 mm) | 200 | 150 | 160 | 180 | 70 |
| Proportion of Rubber-Sticking (%) | 100 | 80 | 100 | 100 | 40 |

As can be seen from these comparative results, the laminate products embodying the invention had a high initial adhesion strength between the fluororesin layer and the cured layer of rubber composition, and a high proportion of rubber-sticking, i.e. the two layers were firmly adhered to one another at the interface by co-curing. The characteristics of the cured rubber composition layers and their changes of properties in the heat stability test in air, as well as in the fuel oil immersion test, were excellent.

By contrast, when the rubber composition having a small content of the highly saturated nitrile group-containing copolymerised rubber and a large content of the epichlorohydrin rubber was used, the rubber layer was expanded by swelling and deteriorated because the layer of cured rubber composition had low heat resistance. Furthermore, when the rubber composition without epichlorohydrin rubber was used, the laminate was liable to peeling because of the low adhesion between the two layers (Comparative Example 2).

What is claimed is:

1. A laminated product comprising a fluororesin layer of a tempolymer of vinylidene fluoride, hexafluoropropylene and tetrafluoroethylene and, superimposed on the fluororesin layer, a layer of cured rubber obtained or obtainable by curing a rubber composition comprising a blend of 60 to 95% nitrile copolymer rubber having an iodine value of not more than 120, with 40 to 5 wt % epihalohydrin rubber.

2. A laminated product according to claim 1 wherein the nitrile copolymer rubber is a hydrogenated acrylonitrile-butadiene rubber.

3. A laminated product according to claim 1 wherein the epihalohydrin rubber is epichlorohydrin rubber.

4. A laminated product according to claim 1 wherein the rubber composition contains an organic peroxide curing agent.

5. A laminated product according to claim 4 wherein the rubber composition contains 0.1 to 15 parts by weight of the organic peroxide curing agent based on 100 parts by weight of the rubber components in the rubber composition.

6. A laminated product according to claim 1 wherein the rubber composition contains an acid receiver, an organic phosphonium salt and bisphenol.

7. A laminated product according to claim 6 wherein the rubber composition contains from 0.5 to 5 parts by weight of acid receiver, 0.5 to 10 parts by weight of the organic phosphonium salt and 0.05 to 2 parts by weight of bisphenol based on 100 parts by weight of the rubber components of the rubber composition.

8. A laminated product according to claim 6 wherein the acid receiver is sodium carbonate.

9. A laminated product according to claim 6 wherein the organic phosphonium salt is tetrabutylphosphonium benzotriazolate.

10. A laminated product according to claim 6 wherein the bisphenol is 4,4'-bis-sulfonylphenol.

11. A laminated product according to claim 1 which is a fuel hose.

12. A method of making a laminated product according to claim 1 comprising curing a layer of the rubber composition in contact with the fluoro-resin layer to form a bond between said layers.

* * * * *